United States Patent [19]

Shiraishi et al.

[11] 4,377,490

[45] Mar. 22, 1983

[54] ADHESIVE COMPOSITION

[75] Inventors: Yoshihisa Shiraishi; Kazuhiro Nakagawa; Chiaki Nakata; Koiti Ohasi, all of Osaka, Japan

[73] Assignees: Sumitomo Chemical Company, Limited; Taoka Chemical Co., Ltd., both of Osaka, Japan

[21] Appl. No.: 300,639

[22] Filed: Sep. 9, 1981

Related U.S. Application Data

[63] Continuation-in-part of Ser. No. 111,820, Jan. 14, 1980, Pat. No. 4,307,216.

[30] Foreign Application Priority Data

Jun. 29, 1979 [JP] Japan .................................. 54-83026
Apr. 10, 1981 [JP] Japan .................................. 56-54631

[51] Int. Cl.$^3$ ...................... C08F 220/36; C09J 3/14; C09J 3/00

[52] U.S. Cl. .............................. 252/188.3 R; 428/442; 428/463; 428/514; 428/522; 526/210; 526/212; 526/292.2; 526/298; 252/182

[58] Field of Search .................. 252/188.3 R, 182; 428/442, 463, 514, 522; 526/210, 212, 292.2, 298

[56] References Cited

U.S. PATENT DOCUMENTS 3,559,652 2/1971 Banitt et al. ........................ 526/298
4,182,823 1/1980 Schoenberg ........................ 526/298

*Primary Examiner*—Irwin Gluck
*Attorney, Agent, or Firm*—Birch, Stewart, Kolasch & Birch

[57] ABSTRACT

An adhesive composition enhanced in initial adhesion strength which comprises (A) an α-cyanoacrylate ester, (B) at least one chosen from aliphatic polyols and their derivatives and polyethers and their derivatives and (C) at least one chosen from aromatic polyols and their derivatives and carboxylic acids and their derivatives.

14 Claims, No Drawings

ADHESIVE COMPOSITION

This is a continuation-in-part application of our copending application Ser. No. 111,820 filed Jan. 14, 1980, now U.S. Pat. No. 4,307,216.

The present invention relates to an adhesive composition. More particularly, it relates to an α-cyanoacrylate compound-containing adhesive composition enhanced in initial adhesion strength.

α-Cyanoacrylate esters are extremely polymerizable, and they are rapidly cured by the moisture at the surface of a solid material or in the atmosphere without using any catalyst or heating. Due to such characteristic property, α-cyanoacrylate esters are used as instantaneous adhesive agents for various materials such as rubbers, plastics, metals and glasses. However, even instantaneous adhesive agents often have inferior initial adhesion strength on the adhesion of some certain materials such as woods, chrome or nickel-plated surfaces, polyesters (e.g. FRP) and phenol resins and are not suitable for quick adhesion of those materials.

As the result of an extensive study, it has now been found that the incorporation of certain specific substances into the adhesive compositions comprising α-cyanoacrylate esters can enhance the initial adhesion strength without deterioration of advantageous characteristic properties inherent to such compositions.

According to the present invention, there is provided an adhesive composition which comprises (A) an α-cyanoacrylate ester, (B) at least one chosen from aliphatic polyols and their derivatives and polyethers and their derivatives and (C) at least one chosen from aromatic polyols and their derivatives and carboxylic acids and their derivatives.

The α-cyanoacrylate ester to be used as the component (A) is representable by the formula:

wherein R is an ester residue, particularly a substituted or unsubstituted, saturated or unsaturated, cyclic or non-cyclic hydrocarbon group such as substituted or unsubstituted alkyl (e.g. methyl, ethyl, n-propyl, isopropyl, n-butyl, isobutyl, sec-butyl, pentyl, hexyl, octyl, ethylhexyl, dodecyl, methoxyethyl, ethoxyethyl, chloroethyl, trifluoroethyl, benzyl), substituted or unsubstituted alkenyl (e.g. allyl), substituted or unsubstituted alkynyl (e.g. propargyl), substituted or unsubstituted aryl (e.g. phenyl, tolyl) or substituted or unsubstituted cycloalkyl (e.g. cyclopentyl, cyclohexyl). Also, R may be a substituted or unsubstituted, saturated or unsaturated heterocyclic group such as tetrahydrofurfuryl.

As the component (B), there may be used any one chosen from aliphatic polyols and their derivatives and polyethers and their derivatives. Examples of the aliphatic polyols are alkane polyols (e.g. ethylene glycol, propylene glycol, tetramethylene glycol, hexamethylene glycol, octamethylene glycol, 3-methylpentane diol, 2,2-diethylpropane diol, 2-ethyl-1,4-butane diol, glycerol, trimethylolmethane, trimethylolethane, trimethylolpropane, 1,2,6-hexanetriol, 2,5-hexanediol), alkene polyols (e.g. polybutadiene diol), halogenated alkane polyols (e.g. chloropropylene glycol), etc. Their derivatives may be esters, ethers, etc. and cover specifically alkyl ethers (e.g. methylcellosolve, ethylcellosolve, ethylene glycol n-butyl ether, propylene glycol methyl ether, tetramethylene glycol propyl ether, ethylene glycol diethyl ether), aryl ethers (e.g. ethylene glycol phenyl ether), aralkyl ethers (e.g. ethylene glycol benzyl ether), alkanoic esters (e.g. ethylene glycol monoacetate, ethylene glycol monolaurate, ethylene glycol monostearate, ethylene glycol distearate, ethylcellosolve stearate, glycerol monolaurate, glycerol monostearate, sorbitan monolaurate), alkenoic esters (e.g. cellosolve acrylate, cellosolve methacrylate, cellosolve crotonate), etc.

The polyethers and their derivatives are those having the repeating units of the formula:

wherein $X^1$ and $X^2$ are each hydrogen, halogen, hydroxyl, alkyl, alkenyl, aryl or aralkyl, the latter four bearing optionally any substituent thereon, p is an integer of not less than 1 and q is an integer of not less than 2. The linear chain comprising the said repeating units may have any atom or group at each of the both terminal positions. Alternatively, the both ends of the linear chain may be combined to form a cyclic ring. In general, p is preferred to be from 2 to 6, and q is favorable to be from 2 to 3,000. When q is more than 10,000, the compatibility of the resulting polyether with the α-cyanoacrylate ester is inferior. Examples of the polyethers and their derivatives are formaldehyde condensates, acetaldehyde condensates, trioxane polymers, polyalkylene glycols (e.g. diethylene glycol, triethylene glycol, tetraethylene glycol, polyethylene glycol, dipropylene glycol, polypropylene glycol, polytetramethylene oxide, poly-3,3-bis(chloromethyl)butylene oxide, poly-1,3-dioxolane, ethylene oxide-propylene oxide block polymers), polyalkylene glycol monoethers (e.g. methylcarbitol, carbitol, diethylene glycol n-butyl ether, diethylene glycol phenyl ether, diethylene glycol benzyl ether, dipropylene glycol ethyl ether, tripropylene glycol methyl ether, polyethylene glycol methyl ether, polyethylene glycol propyl ether, polyethylene glycol lauryl ether, polyethylene glycol stearyl ether, polyoxyethylene nonylphenyl ether, polyethylene glycol allyl ether), polyalkylene glycol diethers (e.g. diethylene glycol diethyl ether, diethylene glycol di-n-butyl ether, triethylene glycol dimethyl ether, tetraethylene glycol distearyl ether, polyethylene glycol dimethyl ether), polyalkylene glycol monoesters (e.g. diethylene glycol ethyl ester, tetraethylene glycol methyl ester, propylene glycol n-butylate, polyethylene gycol methyl ester, polyethylene glycol ethylate, polyethylene glycol laurate, polyethylene glycol cetyl ester, polyethylene glycol stearate, polyethylene glycol oleate, polyoxyethylene sorbitan laurate, diethylene glycol acrylate, diethylene glycol methacrylate, diethylene glycol crotonate), polyalkylene glycol diesters (e.g. diethylene glycol dimethyl ester, diethylene glycol diethyl ester, diethylene glycol diacrylate, diethylene glycol distearate, diethylene glycol dimethacrylate, tetraethylene glycol dicrotonate, polyethylene glycol dimethylate, polyethylene glycol di-n-butylate, polyethylene glycol dilaurate, polyethylene glycol diacrylate, polyethylene glycol dimethacrylate, polyethylene glycol dicrotonate, polyethylene glycol di-α-cyanoacrylate, polyethylene glycol stearyl-methacrylate, polyethylene glycol lauryl-acrylate), polyalkylene glycol monoether monoesters (e.g. acrylates, methacrylates, crotonates or α-cyanoacrylates of glycol monoethers such as methylcarbitol, carbitol, tetraoxyethylene methyl ether, polyoxyethylene lauryl ether, polyoxyethylene nonylphenyl ether), bisphenol A-polyalkylene oxide adducts, trimethylolpropane-polyalkylene oxide adducts, glycerin-polyalkylene oxide adducts, adipic acid-polyalkylene oxide adducts, trimellitic acid-polyalkylene oxide adducts, etc. Their examples forming a cyclic ring are 18-crown-6, 15-crown-5, 18-crown-5, dithia-15-crown, dibenzo-18-crown-6, tribenzo-18-crown-6, dicyclohexyl-18-crown-6, 1.2-naphto-15-crown-5, 1.2-methylbenzo-18-crown-6, etc.

As the component (C), there may be used any one chosen from aromatic polyols and their derivatives and carboxylic acids and their derivatives. The aromatic polyols are representable by the formula:

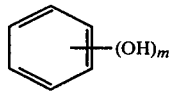

(III)

wherein m is an integer of 2 or 3 and at least two hydroxyl groups are present at the adjacent positions. Specific examples are catechol, pyrogallol, 1,2,4-benzenetriol, etc.

The carboxylic acids are representable by the formula:

A(COOR')$_n$ (IV)

wherein A is a hydrocarbon or heterocyclic compound residue which may be substituted or not, R' is a hydrogen atom or a substituted or unsubstituted hydrocarbon group and n is an integer of not less than 1, provided that at least one R' is a hydrogen atom except the case that A bears two or more phenolic hydroxyl groups. The typical examples of their derivatives include their anhydrides. Specific examples of them are as follows: aliphatic carboxylic acids and their derivatives (e.g. formic acid, acetic acid, glycollic acid, β-hydroxypropionic acid, lactic acid, α-hydroxyisobutyric acid, mannonic acid, gluconic acid, talonic acid, oxalic acid, malonic acid, succinic acid, succinic anhydride, α-ketosuccinic acid, α-methylsuccinic acid, methyl molonic acid, glutaric acid, glutaric anhydride, maleic acid, itaconic acid, monoethyl itaconate, tartoronic acid, ethyltartoronic anhydride, malic acid, α-oxy-α'-methylsuccinic acid, methyltartaric acid, adipic acid, pimelic acid, azelaic acid, sebacic acid, 1-methylbutane-1,4-dicarboxylic acid, 2-methylene-5-methyladipic acid, muconic acid, butenylsuccinic anhydride, α-chloroadipic acid, ethylenebispropionic acid, aconitic acid, di-n-butyl aconitate, 1-butene-2,3,4-tricarboxylic acid, carboxymethyloxysuccinic acid, 1-cyanopropane-1,2,3-tricarboxylic acid, ethane-1,1,2,2-tetracarboxylic acid, cyclohexanedicarboxylic acid and its anhydride, 3-methylhexene-4,5,6-tricarboxylic acid, cyclopentanetetracarboxylic acid, 1,2-dibromo-3-methylcyclohexane-4,5,6-tricarboxylic acid, cinnamic acid, m-hydroxycinnamic acid, mandelic acid, atractinic acid, 1-phenyloxybutane-2,4-dicarboxylic acid); aromatic carboxylic acids and their derivatives (e.g. benzoic acid, salicylic acid, 3-hydroxy-2-nitrobenzoic acid, vanillic acid, 5-hydroxy-3-methylbenzoic acid, 5-nitrovanillic acid, resorcylic acid, protocatechuic acid, propyl protecatechuate, piperonylic acid, gallic acid, dichlorogallic acid, methoxyethyl gallate, phthalic acid, 3,6-dichlorophthalic acid, 4,5-dioxyphthalic acid, 3-nitrophthalic anhydride, diphenic acid, naphthalene-1,5-dicarboxylic acid, trimellitic acid, trimellitic anhydride, pyromellitic acid, pyromellitic anhydride); heterocyclic carboxylic acids and their derivatives (e.g. quinolinic acid, pyrrole-2,3-dicarboxylic acid, quinoxaline-2,3-dicarboxylic acid, 2,5-thiophenedicarboxylic acid, tetrahydrofurantetracarboxylic acid).

Besides, the adhesive composition may comprise any other additive conventionally incorporated into an α-cyanoacrylate ester-containing adhesive composition. Examples of such additives are a stabilizer, particularly an anionic polymerization inhibitor (e.g. sulfur dioxide, sulfonic acid, sultone) and a radical polymerization inhibitor (e.g. hydroquinone, hydroquinone monomethyl ether), a thickening agent (e.g. polymethyl methacrylate), a plasticizer, a colorant, a perfume, a solvent, etc.

In the adhesive composition of the invention, the α-cyanoacrylate ester as the component (A) is usually contained in an amount of not less than 50% by weight, preferably of not less than 80% by weight, based on the total weight of the adhesive composition. However, this is not limitative. The proportions of the components (B) and (C) to the component (A) may be appropriately decided taking into consideration the adhesive property of the resulting composition. In general, the amount of the component (B) may be from 0.05 to 20% by weight on the basis of the weight of the component (A), and the amount of the component (C) may be from 0.0001 to 0.5% by weight on the same basis as above. When their amounts are lower than the said lower limits, the technical effect is insufficient. When their amounts are higher than the said higher limits, the curing rate and the adhesion strength of the component (A) are rather deteriorated.

The adhesive composition of the invention may be used for bonding of various materials. It is particularly notable that such adhesive composition produces a remarkable initial adhesion strength for various materials, especially somewhat acidic materials such as woods, chrome or nickel-plated surfaces, polyesters and phenol resins.

Practical and presently preferred embodiments of the present invention are illustratively shown in the following Examples wherein % is by weight. In these Examples, measurement of adhesion strength was effected as follows: two steel plates (100×25×1.6 mm) were bonded each other with an adhesive area of 25×12.5 mm and cured at 20° C. under a relative humidity of 60%; after cured for 5 minutes and for 24 hours, its tensile shear strength was measured with a pulling rate of 50 mm/min; results being expressed in kg.f/cm².

EXAMPLES 1 TO 9 AND COMPARATIVE EXAMPLES 1 TO 3

An adhesive composition comprising ethyl α-cyanoacrylate and sulfur dioxide as an anionic polymerization inhibitor and hydroquinone as a radical polymerization inhibitor respectively in amounts of 0.0002% and 0.1% based on the weight of ethyl α-cyanoacrylate was incorporated with the components (B) and (C) as shown in Table 1 respectively in amounts of 2% and 0.05% based on the weight of ethyl α-cyanoacrylate. The resultant adhesive composition was subjected to measurement of adhesion strength. The results are shown in Table 1.

For comparison, adhesion strength of the adhesive composition not incorporated with the components (B) and/or (C) was also measured, and the results are shown in Table 1 as Comparative Examples.

From the results in Table 1, it is clearly understood that the incorporation of the components (B) and (C) considerably improves the initial adhesion strength.

TABLE 1

| Example | Component (B) | Component (C) | Tensile shear strength (kg · f/cm$^2$) Cured for 5 minutes | Cured for 24 hours |
|---|---|---|---|---|
| 1 | Ethylene glycol | Gallic acid | 21 | 165 |
| 2 | 1,4-Butanediol | Gallic acid | 33 | 163 |
| 3 | Methylcellosolve | Lauryl gallate | 22 | 161 |
| 4 | Ethylene glycol dimethyl ether | Gallic acid | 32 | 170 |
| 5 | 1,4-Butanediol dimethyl ether | Gallic acid | 36 | 173 |
| 6 | Ethylene glycol monoacrylate | Pyrogallol | 25 | 171 |
| 7 | Ethylene glycol monostearate | Pyrogallol | 24 | 169 |
| 8 | Ethylene glycol diacrylate | Itaconic acid | 27 | 168 |
| 9 | Ethylene glycol | Cinnamic acid | 18 | 141 |
| Comparative | | | | |
| 1 | — | — | 8 | 151 |
| 2 | Methylcellosolve | — | 16 | 119 |
| 3 | — | Itaconic acid | 3 | 239 |

EXAMPLES 10 TO 18 AND COMPARATIVE EXAMPLES 4 TO 8

An adhesive composition comprising ethyl α-cyanoacrylate and sulfur dioxide and hydroquinone respectively in amounts of 0.0015% and 0.1% based on the weight of ethyl α-cyanoacrylate was incorporated with the components (B) and (C) in such amounts as shown in Table 2. The resultant adhesive composition was subjected to measurement of adhesion strength. The results are shown in Table 2.

From the results in Table 2, it is understood that a wide range of the mixing ratio of the components (B) and (C) is effective in enhancement of the initial adhesion strength.

TABLE 2

| Example | Component (B) Kind | Amount[*1] (%) | Component (C) Kind | Amount[*1] (%) | Tensile shear strength (kg · f/cm$^2$) Cured for 5 minutes | Cured for 24 hours |
|---|---|---|---|---|---|---|
| 10 | Polyethylene glycol distearate[*2] | 1.0 | Pyrogallol | 0.01 | 47 | 152 |
| 11 | Polyethylene glycol distearate[*2] | 0.5 | Pyrogallol | 0.05 | 41 | 203 |
| 12 | Polyethylene glycol distearate[*2] | 0.1 | Pyrogallol | 0.1 | 20 | 225 |
| 13 | Polyethylene glycol distearate[*2] | 1.0 | Methoxyethyl gallate | 0.1 | 36 | 136 |
| 14 | Polyethylene glycol distearate[*2] | 0.5 | Methoxyethyl gallate | 0.1 | 32 | 143 |
| 15 | Polyethylene glycol distearate[*2] | 0.1 | Methoxyethyl gallate | 0.1 | 21 | 149 |
| 16 | Polyethylene glycol monomethyl monomethacrylate | 0.1 | Itaconic acid | 0.01 | 18 | 188 |
| 17 | Polyethylene glycol monomethyl monomethacrylate | 0.1 | Itaconic acid | 0.05 | 23 | 210 |
| 18 | Polyethylene glycol monomethyl monomethacrylate | 0.1 | Itaconic acid | 0.1 | 25 | 226 |
| Comparative | | | | | | |
| 4 | Polyethylene glycol distearate[*2] | 0.5 | — | — | 30 | 145 |
| 5 | Polyethylene glycol monomethyl monomethacrylate | 0.5 | — | — | 29 | 146 |
| 6 | — | — | Pyrogallol | 0.05 | 5 | 224 |
| 7 | — | — | Methoxyethyl gallate | 0.05 | 6 | 233 |
| 8 | — | — | — | — | 8 | 151 |

Notes:
[*1] Based on the weight of ethyl α-cyanoacrylate.
[*2] Dissolved in an equal weight of dioxane and then incorporated into the adhesive composition.

EXAMPLES 19 TO 22

An adhesive composition comprising ethyl α-cyanoacrylate and sulfur dioxide and hydroquinone respectively in amounts of 0.002% and 0.1% based on the weight of ethyl α-cyanoacrylate was incorporated with polyethylene glycol distearate as the component (B) and a carboxylic acid or its ester as the component (C) respectively in amounts of 0.5% and 0.05% based on the weight of ethyl α-cyanoacrylate. The resultant adhesive composition was subjected to measurement of adhesion strength. The results are shown in Table 3.

TABLE 3

| Example | | Carboxylic acid or its ester | Tensile shear strength (kg · f/cm²) | |
|---|---|---|---|---|
| | | | Cured for 5 minutes | Cured for 24 hours |
| 19 | A | Gallic acid | 41 | 204 |
| | B | Methoxyethyl gallate | 40 | 200 |
| 20 | A | Protocatechuic acid | 33 | 170 |
| | B | Methyl protocatechuate | 32 | 161 |
| 21 | A | Salicylic acid | 37 | 190 |
| | B | Methyl salicylate | 27 | 151 |
| 22 | A | Adipic acid | 35 | 171 |
| | B | α-Chloroadipic acid | 37 | 178 |
| | C | α,β Dihydroxyadipic acid | 36 | 176 |
| | D | Dimethyl α,β-dihydroxyadipate | 24 | 148 |

EXAMPLES 23 TO 36

An adhesive composition comprising ethyl α-cyanoacrylate and sulfur dioxide and hydroquinone respectively in amounts of 0.002% and 0.1% based on the weight of ethyl α-cyanoacrylate was incorporated with the components (B) and (C) as shown in Table 4. The resultant adhesive composition was subjected to measurement of adhesion strength. The results are shown in Table 4, from which it is understood that the initial adhesion strength and the strength after cured for 24 hours are significantly improved.

TABLE 4

| | Component (B) | | Component (C) | | Tensile shear strength (kg · f/cm²) | |
|---|---|---|---|---|---|---|
| Example | Kind | Amount (%) | Kind | Amount (%) | Cured for 5 minutes | Cured for 24 hours |
| 23 | Polyethylene glycol | 1 | Lactic acid | 0.05 | 30 | 153 |
| 24 | Polyethylene glycol | 1 | Gallic acid lauryl ether | 0.05 | 34 | 175 |
| 25 | Polyethylene glycol methoxyethyl ether | 1 | α-Ketobutyric acid | 0.05 | 28 | 138 |
| 26 | Polyethylene glycol diethyl ether | 1 | Diglycollic acid | 0.05 | 31 | 165 |
| 27 | Polyethylene glycol diethyl ether | 1 | Gallic acid | 0.05 | 33 | 177 |
| 28 | Polyethylene glycol monomethacrylate | 1 | Gallic acid | 0.05 | 36 | 179 |
| 29 | Polyethylene glycol monomethacrylate | 1 | Pyrogallol | 0.05 | 36 | 179 |
| 30 | Polyethylene glycol monolaurate | 1 | Pyrogallol | 0.05 | 33 | 176 |
| 31 | Polyethylene glycol distearate | 0.5 | Pyrogallol | 0.05 | 42 | 203 |
| 32 | Polyethylene glycol diacrylate | 0.5 | Pyrogallol | 0.05 | 16 | 197 |
| 33 | Polyethylene glycol monostearate monolaurate | 0.5 | Pyrogallol | 0.05 | 36 | 200 |
| 34 | Polyethylene glycol monomethyl ether monomethacrylate | 0.5 | Itaconic acid | 0.05 | 40 | 204 |
| 35 | Polyethylene glycol monoethyl ether monolaurate | 0.5 | Pyrogallol | 0.05 | 37 | 198 |
| 36 | 15-Crown-5 | 0.5 | Pyrogallol | 0.05 | 23 | 190 |

EXAMPLES 37 TO 59

An adhesive composition comprising sulfur dioxide and hydroquinone respectively in amounts of 0.0015% and 0.1% based on the weight of ethyl α-cyanoacrylate was incorporated with the components (B) and (C) as shown in Table 5. The resultant adhesive composition was subjected to measurement of adhesion strength. The results are shown in Table 5, from which it is understood that the initial adhesion strength and the strength after cured for 24 hours are improved.

TABLE 5

| | Component (B) | | Component (C) | | Tensile shear strength (kg · f/cm²) | |
|---|---|---|---|---|---|---|
| Example | Kind | Amount (%) | Kind | Amount (%) | Cured for 5 minutes | Cured for 24 hours |
| 37 | Polyethylene glycol methoxyethyl ether | 1 | Glutaric anhydride | 0.05 | 31 | 151 |
| 38 | Polyethylene glycol methoxyethyl ether | 1 | Adipic acid | 0.05 | 30 | 152 |
| 39 | Polyethylene glycol methoxyethyl ether | 1 | α-Chloroadipic acid | 0.05 | 30 | 150 |
| 40 | Polyethylene glycol diethyl ether | 1 | α-Hydroxyadipic acid | 0.05 | 28 | 152 |
| 41 | Polyethylene glycol diethyl ether | 1 | α-Ketoglutaric acid | 0.05 | 29 | 151 |
| 42 | Polyethylene glycol diethyl ether | 1 | Catechol | 0.05 | 25 | 133 |
| 43 | Polyethylene glycol diethyl ether | 1 | Trimellitic acid | 0.05 | 31 | 165 |
| 44 | Polyethylene glycol monomethyl ether monomethacrylate | 0.5 | Aconitic acid | 0.05 | 37 | 189 |
| 45 | Polyethylene glycol monomethyl ether monometh- | 0.5 | Citric acid | 0.05 | 36 | 186 |

TABLE 5-continued

| Example | Component (B) Kind | Amount (%) | Component (C) Kind | Amount (%) | Tensile shear strength (kg · f/cm²) Cured for 5 minutes | Cured for 24 hours |
|---|---|---|---|---|---|---|
| | acrylate | | | | | |
| 46 | Polyethylene glycol monomethyl ether monomethacrylate | 0.5 | Benzoic acid | 0.05 | 31 | 160 |
| 47 | Polyethylene glycol monomethyl ether monomethacrylate | 0.5 | Salicylic acid | 0.05 | 37 | 189 |
| 48 | Polyethylene glycol monomethyl ether monomethacrylate | 0.5 | 3-Hydroxy-2-nitrobenzoic acid | 0.05 | 32 | 161 |
| 49 | Polyethylene glycol monomethyl ether monomethacrylate | 0.5 | Protocatechuic acid | 0.05 | 30 | 164 |
| 50 | Polyethylene glycol monomethyl ether monomethacrylate | 0.5 | Dichlorogallic acid | 0.05 | 40 | 204 |
| 51 | Polyethylene glycol monomethyl ether monomethacrylate | 0.5 | 3-Nitrophthalic anhydride | 0.05 | 31 | 160 |
| 52 | Polyethylene glycol monoethyl ether monolaurate | 0.5 | Propyl gallate | 0.05 | 40 | 201 |
| 53 | Polyethylene glycol monoethyl ether monolaurate | 0.5 | Methoxyethyl gallate | 0.05 | 40 | 205 |
| 54 | Polyethylene glycol monoethyl ether monolaurate | 0.5 | Ethyl gallate | 0.05 | 40 | 204 |
| 55 | Polyethylene glycol monoethyl ether monolaurate | 0.5 | Monoethyl itaconate | 0.05 | 33 | 160 |
| 56 | Polyethylene glycol monoethyl ether monolaurate | 0.5 | Monobutyl trimellitate | 0.05 | 34 | 175 |
| 57 | Polyethylene glycol monoethyl ether monolaurate | 0.5 | Methyl protocatechuate | 0.05 | 30 | 153 |
| 58 | Polyethylene glycol monoethyl ether monolaurate | 0.5 | Furan-2,5-di-β-propionic acid | 0.05 | 30 | 151 |
| 59 | Polyethylene glycol monoethyl ether monolaurate | 0.5 | Protocatechuic acid | 0.05 | 29 | 156 |
| Comparative | — | — | — | — | 8 | 151 |

EXAMPLES 60 TO 64 AND COMPARATIVE EXAMPLES 9 TO 12

An adhesive composition comprising sulfur dioxide and hydroquinone respectively in amounts of 0.0018% and 0.05% based on the weight of ethyl α-cyanoacrylate was incorporated with polyethylene glycol distearate or polyethylene glycol monomethyl monomethacrylate as the component (B) and a carboxylic acid or its ester as the component (C) respectively in amounts of 0.5% and 0.05% based on the weight of ethyl α-cyanoacrylate. Using the resultant adhesive composition, a pair of steel plates (100×25×1.6 mm), lauan plates (100×25×3.0 mm), chrome-plated steel plates (100×25×1.6 mm) or bakelite plates (100×25×2 mm) were bonded with an adhesive area of 25×12.5 mm and cured at 20° C. under a relative humidity of 60% for 5 minutes and for 24 hours in the cases of steel and of bakelite or for 3 minutes and for 24 hours in the cases of lauan and of chrome-plated steel. Tensile shear strength of the bonded product was measured with a pulling rate of 50 mm/min. Results are shown in Table 6.

From the results as shown in Table 6, it is clearly understood that the adhesive composition of the invention is effective in bonding various materials, which could be hardly bonded with a conventional α-cyanoacrylate ester containing adhesive composition, with a sufficient having a poor initial adhesion strength.

TABLE 6

| | | | Tensile shear strength (kg · f/cm²) | | | | | | |
|---|---|---|---|---|---|---|---|---|---|
| | | | Steel plate | | Lauan plate | | Chrome-plated steel plate | | Bakelite | |
| Example | Component (B) | Component (C) | After 5 min | After 24 hr | After 3 min | After 24 hr | After 3 min | After 24 hr | After 5 min | After 24 hr |
| 60 | Polyethylene glycol distearate | Methoxyethyl gallate | 43 | 206 | 33 | 70<*¹ | 35 | 131 | 18 | 70<*¹ |
| 61 | Polyethylene glycol distearate | Itaconic acid | 40 | 210 | 32 | 70<*¹ | 34 | 127 | 15 | 70<*¹ |
| 62 | Polyethylene glycol monomethyl monomethacrylate | Pyrogallol | 39 | 196 | 32 | 70<*¹ | 41 | 128 | 17 | 70<*¹ |
| 63 | Polyethylene glycol monomethyl monomethacrylate | Methoxyethyl gallate | 41 | 200 | 30 | 70<*¹ | 36 | 137 | 16 | 70<*¹ |
| 64 | Polyethylene glycol distearate | Salicylic acid | 38 | 188 | 29 | 70<*¹ | 33 | 120 | 15 | 70<*¹ |
| Comparative | | | | | | | | | | |

TABLE 6-continued

| Example | Component (B) | Component (C) | Steel plate After 5 min | Steel plate After 24 hr | Lauan plate After 3 min | Lauan plate After 24 hr | Chrome-plated steel plate After 3 min | Chrome-plated steel plate After 24 hr | Bakelite After 5 min | Bakelite After 24 hr |
|---|---|---|---|---|---|---|---|---|---|---|
| | | | \multicolumn{8}{c}{Tensile shear strength (kg · f/cm²)} |
| 9 | Polyethylene glycol distearate | — | 30 | 145 | 21 | 70<*¹ | 23 | 96 | 11 | 70<*¹ |
| 10 | Polyethylene glycol monomethyl monomethacrylate | — | 29 | 146 | 20 | 70<*¹ | 22 | 92 | 12 | 70<*¹ |
| 11 | — | — | 8 | 151 | 0 | 70<*¹ | 13 | 91 | 5 | 70<*¹ |
| 12 | — | Itaconic acid | 3 | 240 | 0 | 70<*¹ | 8 | 122 | 2 | 70<*¹ |

Note:
*¹material failure.

We claim:

1. An adhesive composition which comprises (A) an α-cyanoacrylate ester, (B) at least one chosen from aliphatic polyols and their derivatives and polyethers and their derivatives and (C) at least one chosen from aromatic polyols and their derivatives and carboxylic acids and their derivatives.

2. The composition according to claim 1, wherein the α-cyanoacrylate ester is the one of the formula:

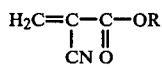

wherein R is an ester residue.

3. The composition according to claim 2, wherein the ester residue is a substituted or unsubstituted, saturated or unsaturated, cyclic or non-cyclic hydrocarbon group.

4. The composition according to claim 2, wherein the ester residue is a substituted or unsubstituted, saturated or unsaturated heterocyclic group.

5. The composition according to claim 2, wherein R is $C_1$-$C_{16}$ alkyl, $C_1$-$C_4$ alkoxy($C_1$-$C_4$)alkyl or tetrahydrofurfuryl.

6. The composition according to claim 1, wherein the aliphatic polyols and their derivatives are alkane polyols, alkene polyols and halogenated alkane polyols, and their esters and ethers.

7. The composition according to claim 1, wherein the polyethers and their derivatives are those having the repeating units of the formula:

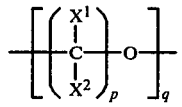

wherein $X^1$ and $X^2$ are each hydrogen, halogen, hydroxyl, alkyl, alkenyl, aryl or aralkyl, the latter four bearing optionally any substituent thereon, p is an integer of not less than 1 and q is an integer of not less than 2.

8. The composition according to claim 1, wherein the aromatic polyols and their derivatives are those of the formula:

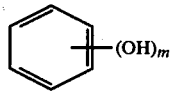

wherein m is an integer of 2 or 3 and at least two hydroxyl groups are present at the adjacent positions.

9. The composition according to claim 1, wherein the carboxylic acids and their derivatives are those of the formula:

wherein A is a hydrocarbon or heterocyclic compound residue which may be substituted or not, R' is a hydrogen atom or a substituted or unsubstituted hydrocarbon group and n is an integer of not less than 1, provided that at least one R' is a hydrogen atom except the case that A bears two or more phenolic hydroxyl groups.

10. The composition according to claim 9, wherein the carboxylic acids and their derivatives are anhydrides.

11. The composition according to claim 1, wherein the content of the component (A) is not less than 50% by weight based on the total weight of the composition.

12. The composition according to claim 11, wherein the content of the component (A) is not less than 80% by weight based on the total weight of the composition.

13. The composition according to claim 1, wherein the content of the component (B) is from 0.05 to 20% by weight based on the weight of the component (A).

14. The composition according to claim 1, wherein the content of the component (C) is from 0.0001 to 0.5% by weight based on the weight of the component (A).

* * * * *